(12) United States Patent
von zur Meuhlen (10) Patent No.: US 11,920,803 B2
(45) Date of Patent: Mar. 5, 2024

(54) SYSTEMS AND METHODS FOR PROVIDING A FIXTURE SUPPORTING DIFFERENT LEVELS OF PERMANENCE

(71) Applicant: Marley Engineered Products LLC, Burr Ridge, IL (US)

(72) Inventor: Alex von zur Meuhlen, Valparaiso, IN (US)

(73) Assignee: MARLEY ENGINEERED PRODUCTS LLC, Burr Ridge, IL (US)

( * ) Notice: Subject to any disclaimer, the term of this patent is extended or adjusted under 35 U.S.C. 154(b) by 617 days.

(21) Appl. No.: 16/696,206

(22) Filed: Nov. 26, 2019

(65) Prior Publication Data

US 2021/0156573 A1    May 27, 2021

(51) Int. Cl.
*F24F 1/0314*   (2019.01)
*F24F 13/20*    (2006.01)
*F24F 13/32*    (2006.01)
*F24H 3/00*     (2022.01)
*H02G 3/08*     (2006.01)

(52) U.S. Cl.
CPC ............ *F24F 1/0314* (2019.02); *F24F 13/20* (2013.01); *F24F 13/32* (2013.01); *F24H 3/002* (2013.01); *H02G 3/08* (2013.01)

(58) Field of Classification Search
CPC ......... F24F 1/0314; F24F 13/32; F24H 3/002; F24H 3/0417; H02G 3/08; H02G 3/12
See application file for complete search history.

(56) References Cited

U.S. PATENT DOCUMENTS

| | | | | |
|---|---|---|---|---|
| 2,611,068 A | * | 9/1952 | Wellens | F24H 1/00 219/541 |
| 4,804,821 A | * | 2/1989 | Glucksman | A61L 9/03 261/DIG. 89 |
| 4,816,973 A | * | 3/1989 | Atalla | F21S 8/035 362/101 |
| 4,873,422 A | * | 10/1989 | Streich | F24H 9/06 392/363 |
| 5,239,610 A | * | 8/1993 | Shao | F24H 3/0417 174/56 |
| 5,495,402 A | * | 2/1996 | Houssian | H01R 13/447 362/186 |
| 6,280,211 B1 | * | 8/2001 | Tateishi | H01R 13/4534 439/651 |
| 2019/0348827 A1 | * | 11/2019 | Illouz | H02G 3/12 |

* cited by examiner

*Primary Examiner* — Joseph F Trpisovsky
(74) *Attorney, Agent, or Firm* — Husch Blackwell LLP (57) ABSTRACT

A system configured to provide supplemental heating or cooling is provided. Some embodiments may include the fixture having an air movement device and a back surface configured for a flush mount on a wall, the back surface having a recess sized to substantially the same dimensions of a cover of an electrical outlet. The flush mount may provide a degree of permanence for the fixture that satisfies a criterion.

20 Claims, 10 Drawing Sheets

SYSTEMS AND METHODS FOR PROVIDING A FIXTURE SUPPORTING DIFFERENT LEVELS OF PERMANENCE

TECHNICAL FIELD

The present disclosure relates generally to systems and methods for configuring a fixture to modulate temperature of a space via forced airflow, while supporting three different levels of installation permanence.

BACKGROUND

Heating and cooling appliances are well-known, including space heaters, baseboard heaters, and wall-mounted heaters that connect to sockets of electrical outlets. Space heaters problematically take up floor space, baseboard heaters require costly professional installations, and known wall heaters are liable to be bumped such that a connection is severed, a dangerous arc is caused at the power terminals, and/or the wall is damaged.

SUMMARY

Systems and methods are disclosed for providing a fixture configured to provide supplemental heating or cooling. An installation of the fixture onto a wall may be performed such that the fixture is mounted flush with the wall, effectively providing a degree of permanence for the fixture that satisfies a first criterion. Some embodiments may include the fixture having a back surface configured to have the flush mount, e.g., via a recess substantially sized to same dimensions of a cover of an electrical outlet.

Implementations of any of the described techniques and architectures may include a method, process, an apparatus, a device, a machine, or a system.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment, and should not be interpreted as defining or limiting the range of values or properties encompassed by example embodiments.

Figure 1:
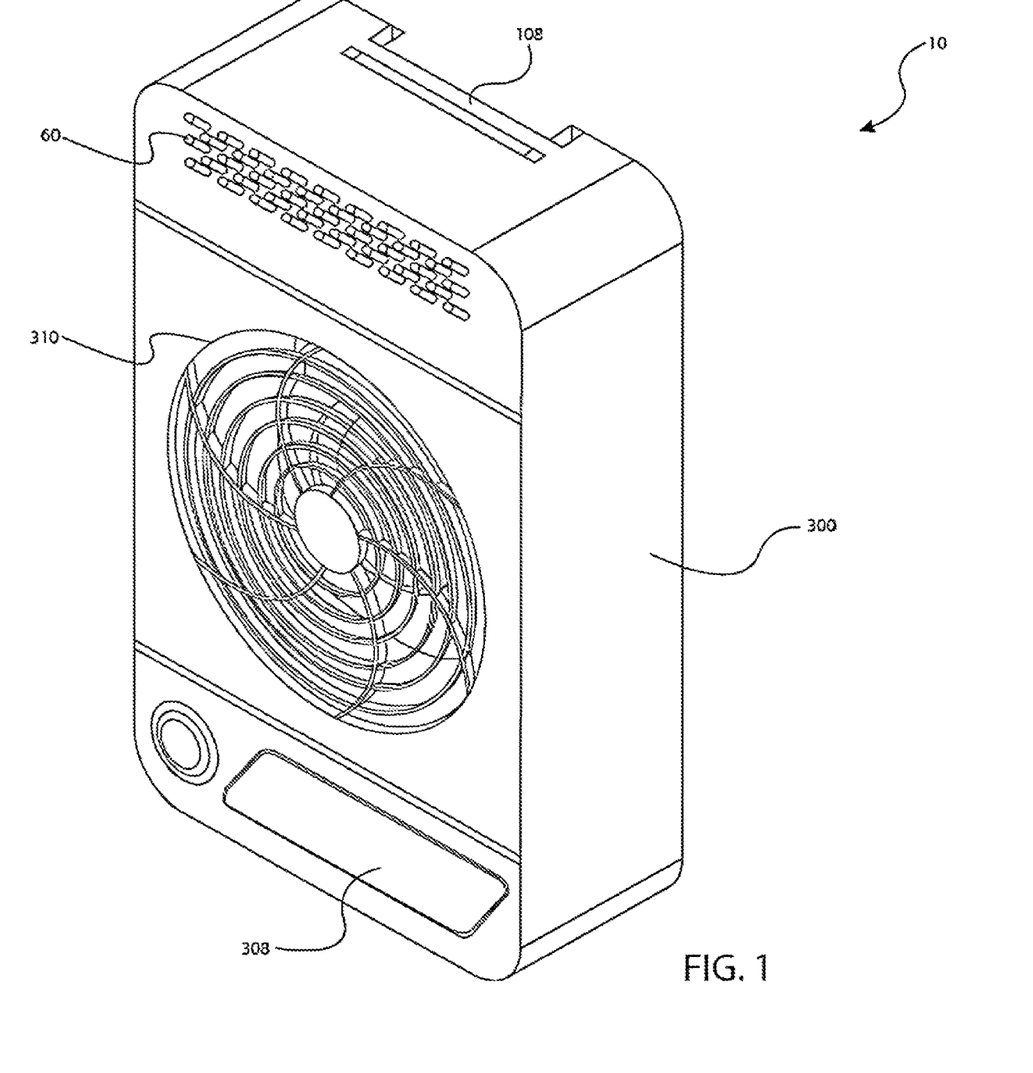
FIG. 1 illustrates a frontal, isometric view of a system by which temperature of a room can be semi-permanently modulated, in accordance with one or more embodiments.
Figure 2:
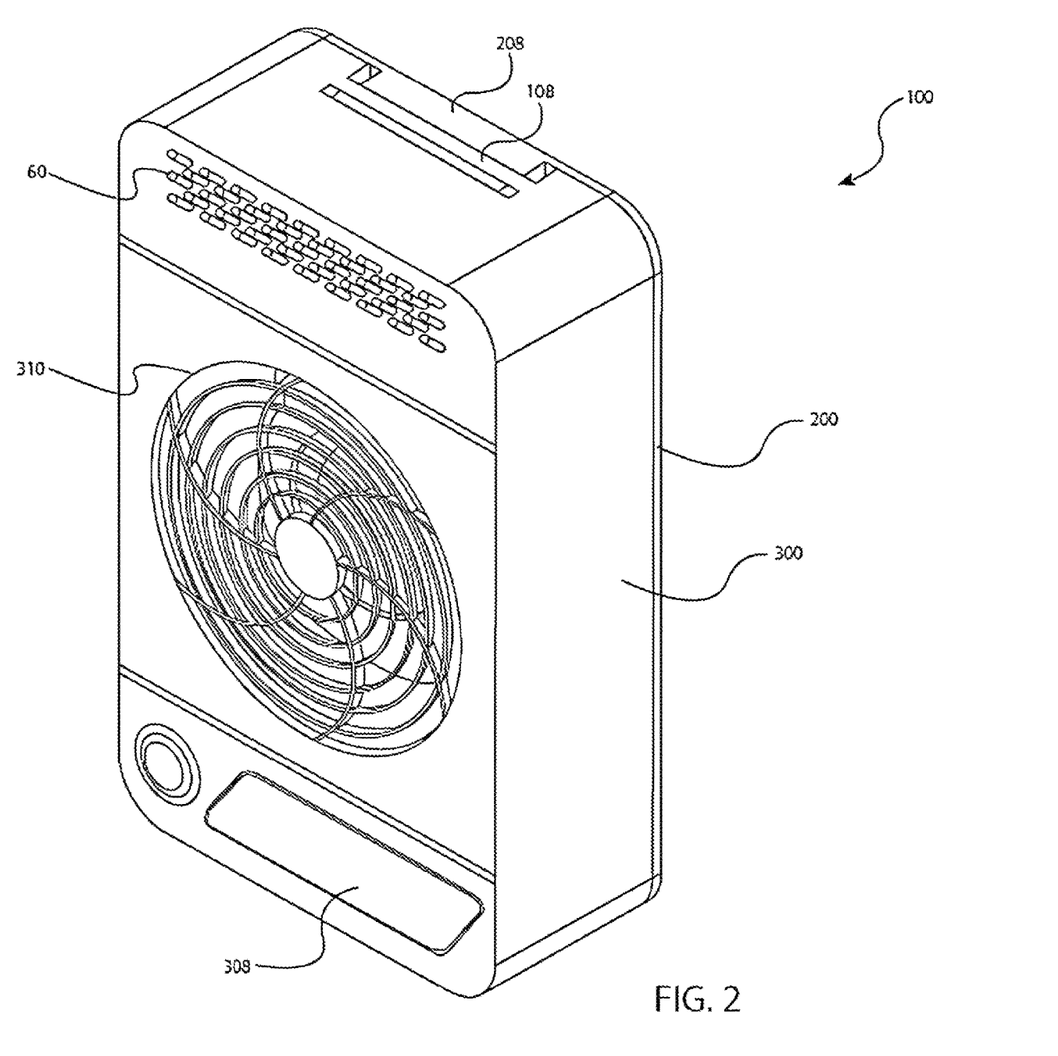
FIG. 2 illustrates a frontal, isometric view of a system by which temperature of a room can be more-permanently modulated, in accordance with one or more embodiments.

FIG. 1 illustrates system 10 configured to modulate temperature with an emitted airflow for an enclosing space. More particularly, fixture 10 may include housing 300 and backplane 110 in relation to which the fixture is securely mounted to a wall of the space. Fixture 10 may be fixedly coupled to backplate 200, as depicted in FIG. 2 by assembly 100.

In some embodiments, fixture 10 may support three distinctly functional configurations, respectively having medium, greater, and greatest levels of permanence and installation safety, without requiring any structural changes (e.g., to housing 300) other than installation of backplate 200 and a set of fasteners. These distinct configurations may be readily available with minimal or no need for a professional installer. For example, fixture 10 may alone implement the installation of medium permanence, fixture 100 (e.g., which includes backplate 200) may implement the installation of greater permanence, and hard-wired fixture 100 may implement the installation of greatest permanence.

Figure 4:
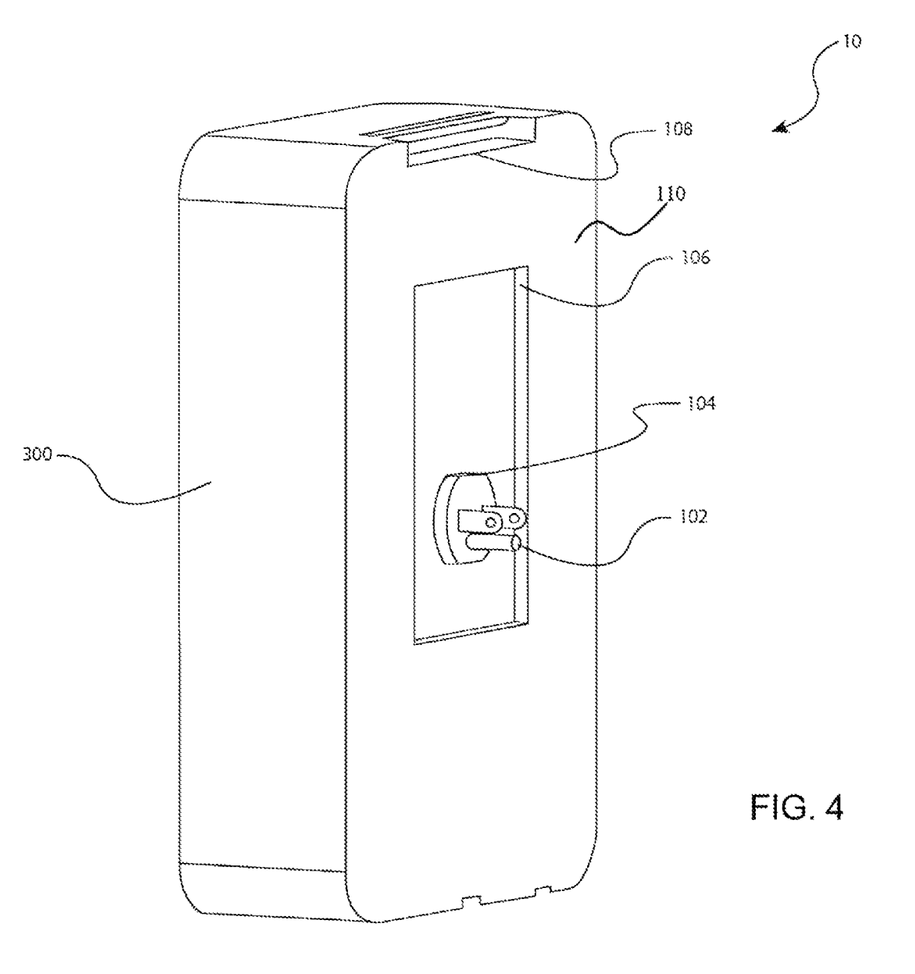
FIG. 4 illustrates a rear, isometric view of a system by which temperature of a room can be semi-permanently modulated, in accordance with one or more embodiments.

In some embodiments, temperature modulating fixture 10 may comprise a back surface (see, e.g., backplane 110 of FIG. 4) having recess 106, which may allow a flush, temporary installation over an outlet cover (i.e., without having to remove cover 80A, 80B or anything else). For example, recess 106 may be sized to match dimensions (e.g., length, width, and/or depth) of cover 80 of an electrical outlet.

Figure 5:
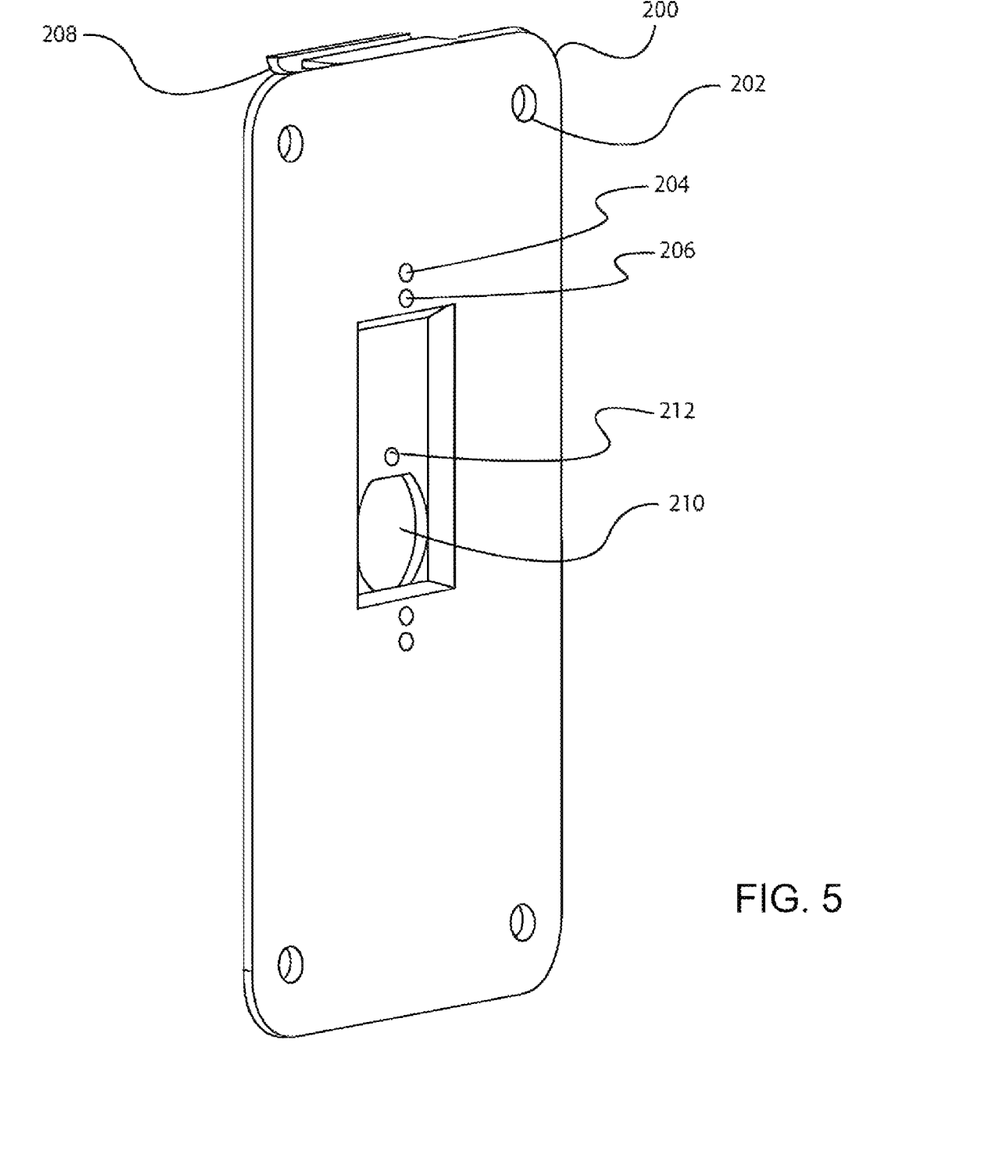
FIG. 5 illustrates an isometric view of a backplate that may be coupled to the temperature-modulating system, in accordance with one or more embodiments.
Figure 6:
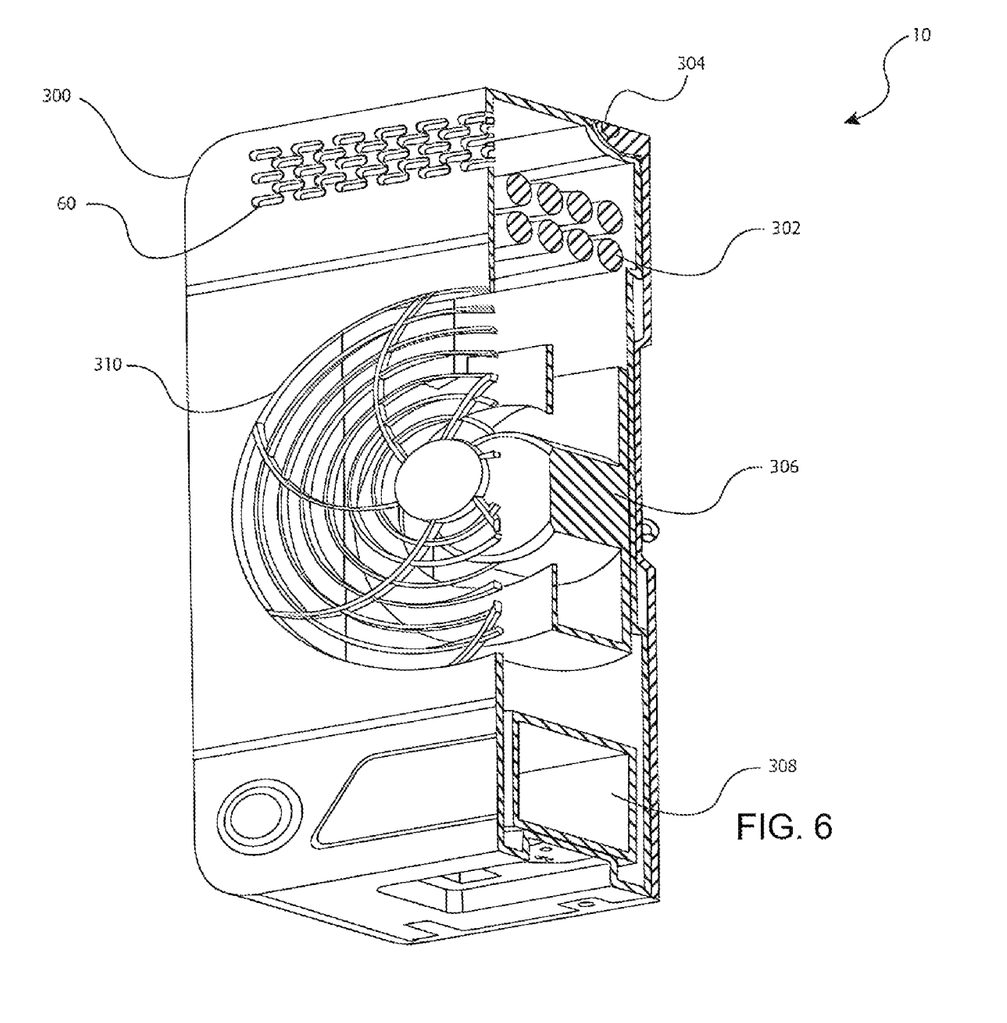
FIG. 6 illustrates a frontal, isometric view of a cross-section of the temperature-modulating system, in accordance with one or more embodiments.
Figure 7:
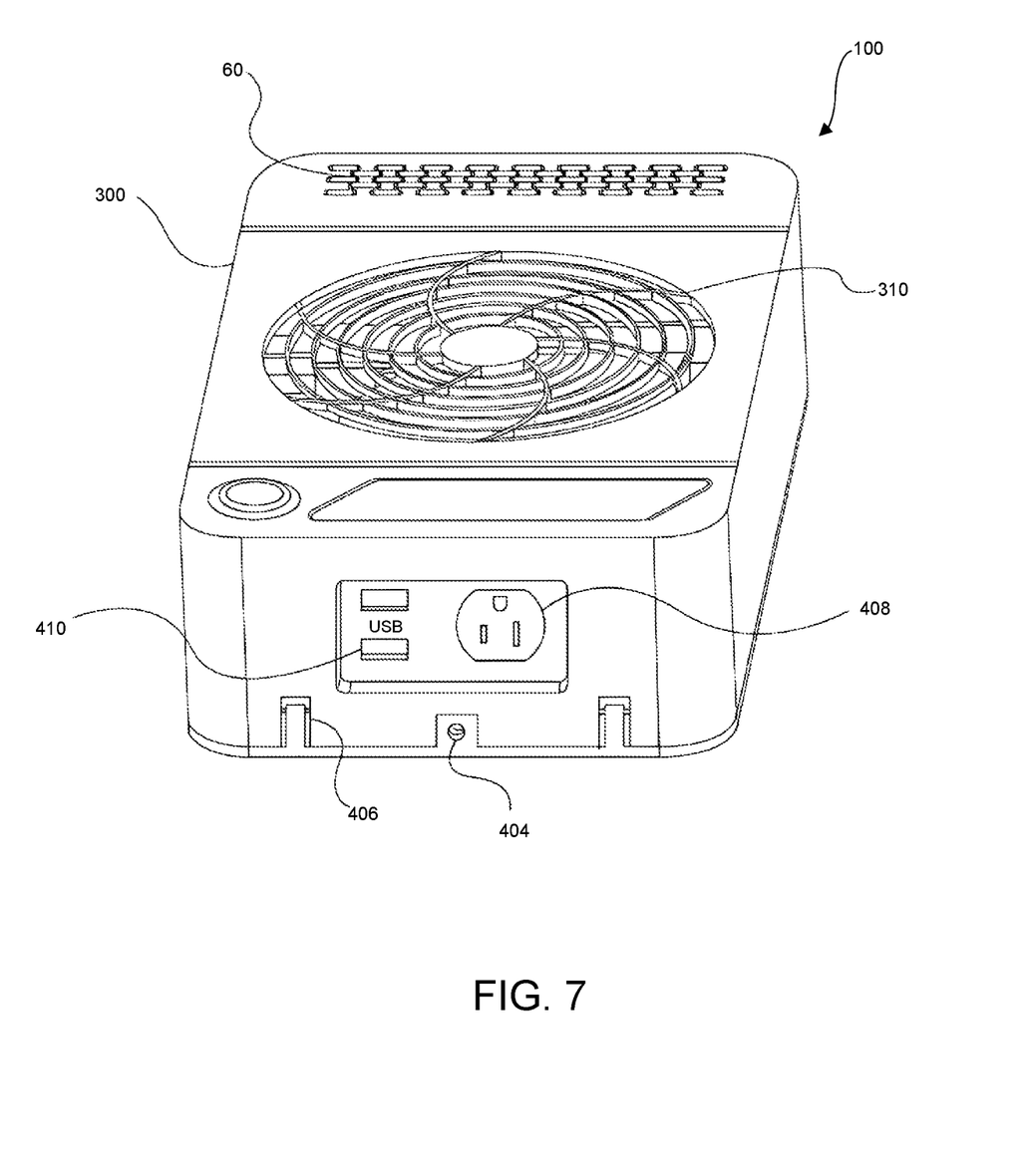
FIG. 7 illustrates an isometric view of a bottom of the temperature-modulating system, in accordance with one or more embodiments.

In implementations with backplate 200, this backplate may replace cover 80A, 80B. In some embodiments, fixture 100 may be rotated using snapping component 108 to secure this fixture to backplate 200 using snapping component 208 such that a greater degree of permanence is met. These components may also be referred to as hinge components. In these or other embodiments, fixture 100 may be secured to backplate 200 using snap components 406. The snapping functionality depictable with respect to FIGS. 4-5 and 7 may be performed via one or more snaps 108, 208, 406 or with snap fasteners (e.g., a pair of interlocking discs).

In some embodiments, a degree of permanence is provided via a flush mount. In some embodiments, the degree of permanence is enhanced by a size of the recess fitting snug on the outlet cover (e.g., with rounded edges hugging the cover). At least some of the disclosed degrees of permanence may protect against an arc, which may otherwise occur when the degree(s) of permanence is not achieved. Known deficiencies in the art include scenarios that involve a partial unplugging from the outlet of fixture 10, 100 due to a jostling of the fixture. As such, even the disclosed lowest degree of permanence for the fixture that satisfies a first criterion may still improve upon known approaches by implementing safety via (i) the different flush-mountings disclosed herein, (ii) the snap fit of fixture 10 onto backplate 200, and/or (iii) use of one or more set screws at hole 404 to better lock backplate 200 onto fixture 10. The set screw(s) may be used to complement or replace the snapping. In some implementations, one set screw may be used at a bottom (or top) and towards the back of housing 300. In other implementations, two (or more) set screws may be used (e.g., which may render snapping components 108, 208 unnecessary).

In some embodiments, the embodiment facilitating the greater degree of installation permanence may implement a different flush mount on the wall than from the embodiment facilitating the medium degree of installation permanence. This different flush mount may provide another degree of permanence for the fixture that satisfies a second criterion greater than the first criterion. This other degree of permanence may be based on one or more screws that fasten backplate 200 into the wall. The greater and greatest degrees of permanence may be performed without enlarging an opening (e.g., the opening designed for housing 90) in the wall.

In some implementations, the flush mount of fixture 10, 100 may reduce a probability of damage to the wall via a jostling of the fixture. In these or other implementations, fixture 10, 100, when installed on the wall, may be elevated above a ground or floor level of the space formed by walls including this wall. This installation of fixture 10, 100 onto the wall may result in no floor space being consumed by the installation and a probability of occurrence of a jostling of the fixture being less. A possible jostling may be an angular force applied to the fixture that breaches a threshold. By being elevated above the floor or ground of the space in which fixture 10, 100 is installed, this fixture is less likely to be in the way of people and things moving in the space (i.e., posing a lower hazard). It is also less likely that someone in the space may inadvertently cover-up (e.g., with flammable material) the fixture, which would pose another hazard. The disclosed degrees of permanence may comprise withstanding a jostling of the fixture, e.g., without causing any significant movement out of place. The jostling resistance may be achieved via any of the three different levels of permanence performance, but to progressively greater degrees (e.g., the third being greater than the second, and the second being greater than the first).

In some embodiments, plug 104 and/or conductors 102 of fixture 10 may traverse a portion of recess 106 in backplane 110 of housing 300 for mating with outlet 82A, 82B. In other embodiments, plug 104 and/or conductors 102 of fixture 100 may traverse opening 210 of backplate 200 for mating with a socket of outlet 82A, 82B (but without using outlet cover 80A, 80B). In some embodiments, opening 212 of backplate 200 may be precisely located such that a fastener may pass through (i.e., instead of using opening 84 of outlet cover 80A).

In some embodiments, fixture 100 may be hard-wired to the wall's electrical power wiring providing (i) a greatest degree of permanence for the fixture and (ii) a more robust connection to electrical wiring in the wall than if connectors were used, the greatest degree of permanence satisfying a third criterion greater than each of the first and second criteria. In some implementations, the two greater degrees of permanence and more robust connection for fixture 100 may be achieved at a lower cost than if, e.g., a baseboard assembly or another permanent fixture were professionally installed at the wall.

In some implementations, a hard-wired connection between electrical wiring of a wall and fixture 100 may be performed with fewer parts such that a probability of disconnection is less. For instance, new home constructions may omit in the corresponding plans a need for outlet cover 80, outlet 82, and/or outlet housing 90, omission of these parts resulting in a lower cost installation for temperature enhancing fixture 100. Similarly, fixture 100 may be implemented without outlet 104, including prongs 102, which further reduces cost for users. The permanent, hard-wired connection may be performed using wire nuts (e.g., twist-on wire connectors). The wire nuts may provide a more robust connection than traditional connections using terminals of conventional outlets (e.g., with a spring-loaded outlet cover).

In some embodiments, fan 306 and ventilation port 310 may be configured such that (i) ambient air is pulled into housing 300 through air ventilation port 310 and forced upward (or downward) and that (ii) air modulated by temperature modulating element 302 is exerted orthogonally away from the wall through openings 60 of a front surface of housing 300 towards user(s) of a space (i.e., rather than up or down the wall), for a safety measure. In some implementations, air ventilation port 310 may comprise vanes for moving the air directionally.

In some embodiments, controls 308 may be configured to obtain an output from one or more temperature sensors or thermistors and then determine a different target temperature based on the temperature measurement(s). In these or other embodiments, controls 308 and temperature modulating element 302 may be positioned at opposite ends of housing 300, for an additional safety measure. In some embodiments, controls 308 may be positioned relative to the outflow from openings 60 (e.g., above, below, or to a side of them).

In some embodiments, frame 300 or another housing structure of fixture 100 may be sized in relation to backplate 200 for particular applications. In these or other embodiments, dimensions of housing 300 may be within two to three times the dimensions of cover 80A, 80B. Backplate 200 may be sized to substantially the same width and height dimensions of housing 300.

In some embodiments, fixture 10 may not include snap 108 just as backplate 200 may not include snap 208. In these or other embodiments, fixture 10 may not require a set screw to secure backplate 200 thereon.

In some embodiments, backplate 200 may have an opening to install over the outlet cover without needing to remove the outlet cover.

In some embodiments, fixture 10, 100 may comply with one or more standards of underwriters laboratories (UL). For example, fixture 10, 100 may be cross-listed as both a permanent and temporary electrical wall heater. In another example, fixture 10, 100 may be cross-listed as both a permanent and temporary electrical wall cooler.

In some embodiments, fixture 10, 100 may support 110 volts alternating current (VAC), for home uses, or 220 VAC, for industrial or more commercial spaces. For example, controls 308 and temperature modulating element 302 may be powered with respect to 110 or 220 VAC. Controls 308 may be activated via a push button, as depicted in FIGS. 1-2, or via any other suitable means.

In some embodiments, fixture 10, 100 may progressively make a more secure connection via two or even four plugs 104 that fixedly couple to two or four (e.g., in a double-gang configuration) outlets 82, respectively, e.g., rather than with only one electrical connection. In these embodiments, one or more of these additional connections may be used only for mechanical fixation (e.g., without the conductors therein facilitating current draw) in mounting the fixture onto the wall at the outlet.

In some embodiments, insulating material may be directly coupled to backplate 200 such that heat (or coolness) generated by fixture 100 is not thermally conducted to the wall.

In some embodiments, fixture 10, 100 may comprise one or more universal serial bus (USB) connectors 410 such that user(s) may charge devices, without being inconvenienced by the fixture occupying and/or blocking outlet 82.

Figure 8:
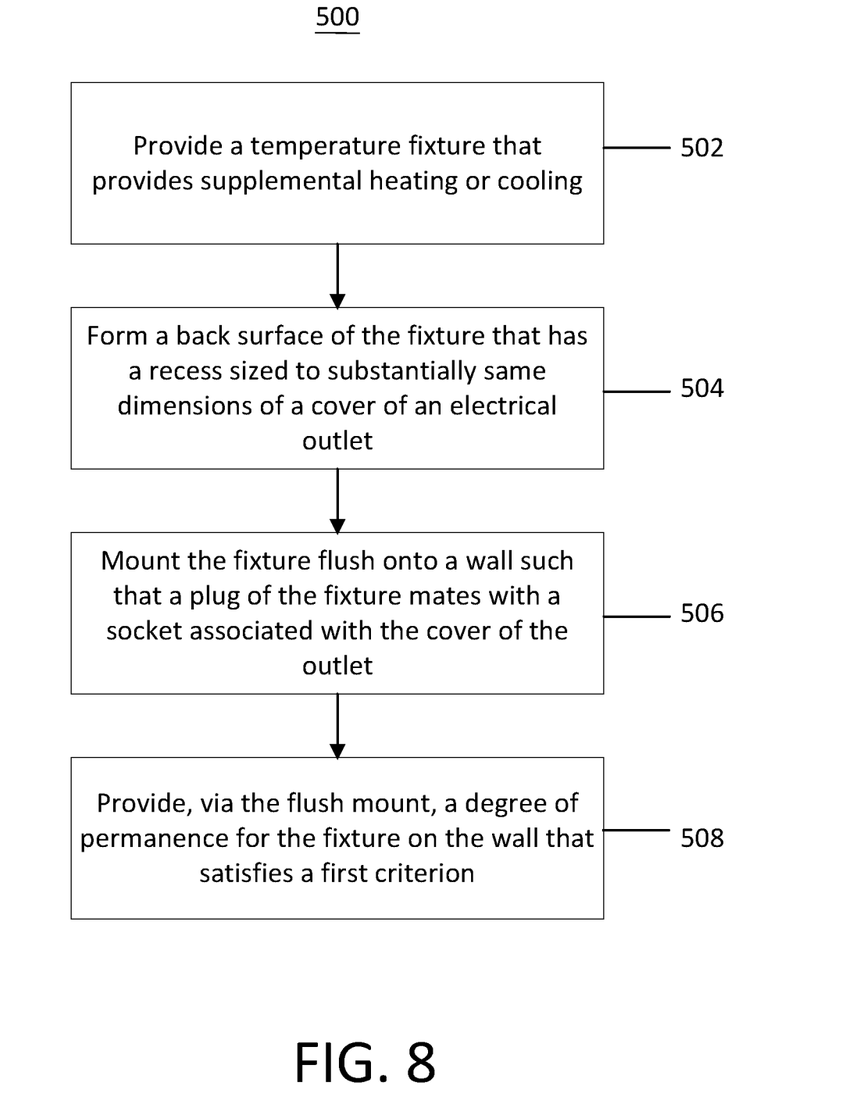
FIG. 8 illustrates a process for modulating the temperature of the room by a fixture in a semi-permanent configuration, in accordance with one or more embodiments.
Figure 9:
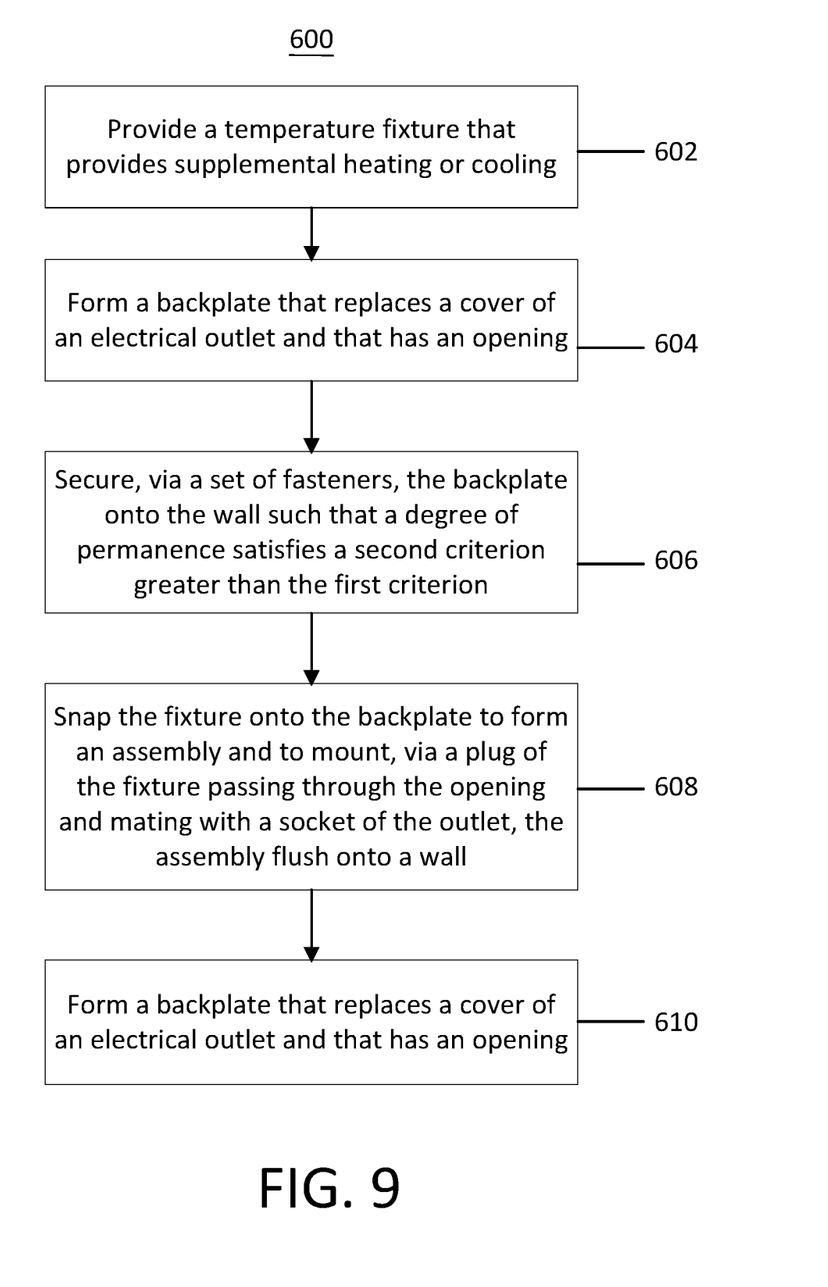
FIG. 9 illustrates a process for modulating the temperature of the room by the fixture in a more-permanent configuration, in accordance with one or more embodiments.
Figure 10:
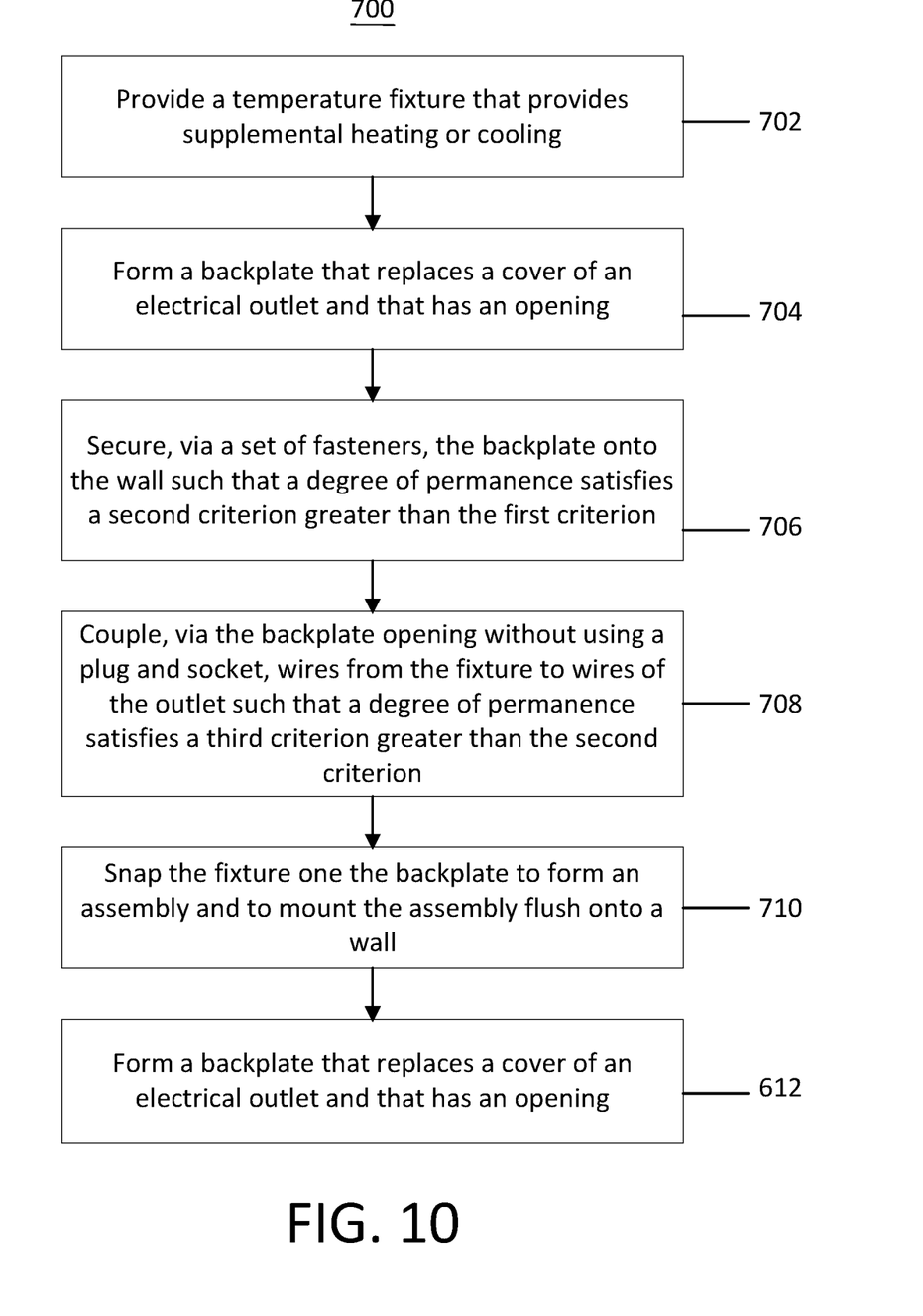
FIG. 10 illustrates a process for modulating the temperature of the room by the fixture in a most-permanent configuration, in accordance with one or more embodiments.

FIGS. 8-10 illustrate methods 500, 600, and 700 for providing a temperature modulating fixture, in accordance with one or more embodiments. Each of methods 500, 600, and 700 may be performed by an ordinary user, e.g., without any particular training in appliances or electromechanics. The operations of methods 500, 600, and 700 presented below are intended to be illustrative. In some embodiments, methods 500, 600, and 700 may be accomplished with one or more additional operations not described, and/or without one or more of the operations discussed. Additionally, the order in which the operations of methods 500, 600, and 700 are illustrated in FIGS. 8-10 and described below is not intended to be limiting.

At operation 502 of method 500, a temperature fixture may be provided that provides supplemental heating or cooling. In some embodiments, operation 502 is performed using fixture 10 (shown in FIG. 1 and described herein).

At operation 504 of method 500, a back surface of the fixture may be formed that has a recess sized to substantially same dimensions of a cover of an electrical outlet. In some embodiments, operation 504 is performed to manufacture backplane 110 of fixture 10 that has recess 106 (shown in FIG. 4 and described herein).

Figure 3:
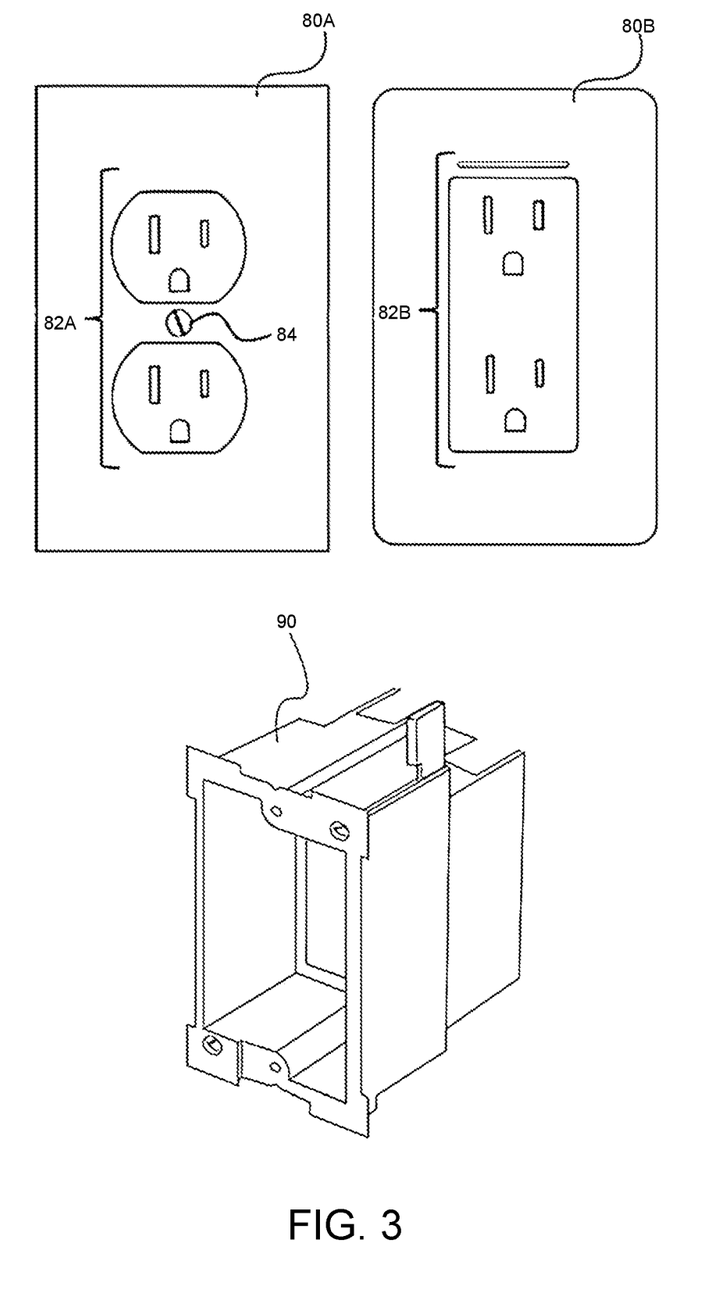
FIG. 3 illustrates known parts of a wall outlet.

At operation 506 of method 500, the fixture may be mounted flush onto a wall such that a plug of the fixture mates with a socket associated with the cover of the outlet. In some embodiments, operation 506 is performed by mating plug 104 of fixture 10 with outlet 82A, 82B associated with cover 80A, 80B (shown in FIGS. 3-4 and described herein).

At operation 508 of method 500, a degree of permanence may be provided for the fixture on the wall, via the flush mount, such that a first criterion is satisfied. In some embodiments, operation 508 is performed by recess 106 enclosing the outlet cover.

At operation 602 of method 600, a temperature fixture may be provided that provides supplemental heating or cooling. In some embodiments, operation 602 is performed using fixture 100 (shown in FIG. 2 and described herein).

At operation 604 of method 600, a backplate may be formed that replaces a cover of an electrical outlet and that has an opening. In some embodiments, operation 604 is performed to manufacture backplate 200 (shown in FIG. 5 and described herein).

At operation 606 of method 600, the backplate may be secured, via a set of fasteners, onto the wall such that a degree of permanence satisfies a second criterion greater than the first criterion. In some embodiments, operation 606 is performed by screwing, via openings 202, backplate 200 directly to the wall. In these or other embodiments, operation 606 is performed by fastening, via openings 204, backplate 200 in place of outlet cover 80A, 80B. In these or other embodiments, operation 606 is performed by fastening, via openings 206, backplate 200 directly to outlet box 90. In these or other embodiments, operation 606 is performed by fastening, via openings 212, backplate 200 in place of outlet cover 80A, 80B. This operation is demonstrable in FIGS. 3 and 5, as further described herein.

At operation 608 of method 600, the fixture may be snapped onto the backplate to form an assembly and to mount the assembly flush onto a wall. This mounting may be performed via a plug of the fixture passing through the opening and mating with a socket of the outlet. In some embodiments, operation 608 is performed using fixture 100 (shown in FIG. 2 and described herein).

At operation 610 of method 600, the fixture may be secured, via another set of fasteners, to the backplate. In some embodiments, operation 610 is performed with a set screw at opening 404 (shown in FIG. 7 and described herein), in relation to fixture 100, which includes backplate 200.

At operation 702 of method 700, a temperature fixture may be provided that provides supplemental heating or cooling. In some embodiments, operation 702 is performed using fixture 100 (shown in FIG. 2 and described herein).

At operation 704 of method 700, a backplate may be formed that replaces a cover of an electrical outlet and that has an opening. In some embodiments, operation 704 is performed to manufacture backplate 200 (shown in FIG. 5 and described herein).

At operation 706 of method 700, the backplate may be secured, via a set of fasteners, onto the wall such that a degree of permanence satisfies a second criterion greater than the first criterion. In some embodiments, operation 706 is performed by screwing, via openings 202, backplate 200 directly to the wall. In these or other embodiments, operation 706 is performed by fastening, via openings 204, backplate 200 in place of outlet cover 80A, 80B. In these or other embodiments, operation 706 is performed by fastening, via openings 206, backplate 200 directly to outlet box 90. In these or other embodiments, operation 706 is performed by fastening, via openings 212, backplate 200 in place of outlet cover 80A, 80B. This operation is demonstrable in FIGS. 3 and 5, as further described herein.

At operation 708 of method 700, wires from the fixture may be coupled to wires of the outlet, via the backplate opening without using a plug and socket, such that a degree of permanence satisfies a third criterion greater than the second criterion. In some embodiments, operation 708 is performed by permanently affixing (e.g., hard-wiring) fixture 100 to the wall's wiring using wire-nuts, soldering, or via another, suitable means.

At operation 710 of method 700, the fixture may be snapped onto the backplate to form an assembly and to mount the assembly flush onto a wall. In some embodiments, operation 710 is performed using fixture 100 (shown in FIG. 2 and described herein).

At operation 712 of method 700, the fixture may be secured to the backplate, via another set of fasteners. In some embodiments, operation 712 is performed using a set screw at opening 404 (shown in FIG. 7 and described herein), in relation to fixture 100, which includes backplate 200.

Several embodiments of the invention are specifically illustrated and/or described herein. However, it will be appreciated that modifications and variations are contemplated and within the purview of the appended claims.

What is claimed is:

1. A system, comprising:
    a fixture configured to provide supplemental heating to a space having a wall,
    wherein the fixture comprises:
        one or more temperature sensors for measuring an air temperature of the space;
        an air movement device configured to circulate a heated airflow through the fixture to heat the space; and
        a back surface configured for a flush mount on the wall, the back surface having a recess sized to substantially the same dimension of a cover of an electrical outlet,
    wherein the flush mount provides a first degree of permanence for the fixture that satisfies a first criterion.

2. The system of claim 1, wherein the fixture further comprises a controls component configured to determine a target temperature based on the measured air temperature, and a heating element configured to heat air when activated by the controls component.

3. The system of claim 1, wherein the flush mount is performed without having to remove the cover and reduces a probability of damage to the wall via a jostling of the fixture.

4. The system of claim 1, wherein the flush mount prevents an arc across terminals of the electrical outlet, which would otherwise occur by the fixture being partially unplugged from the electrical outlet due to a jostling of the fixture.

5. The system of claim 1, further comprising:
    a backplate configured to replace the cover, wherein the fixture is directly coupled, via snapping means, to the backplate,
    wherein the fixture is configured, via the backplate, for a different flush mount on the wall, and
    wherein the different flush mount provides a second degree of permanence for the fixture that satisfies a second criterion greater than the first criterion, the second degree of permanence being based on one or more fasteners that fasten the backplate into the wall.

6. The system of claim 5, further comprising:
    a plug of the fixture,
    wherein the plug is configured to pass through an opening in the backplate into a socket of the electrical outlet.

7. The system of claim 5, wherein the fixture is hard-wired to the electrical outlet providing (i) a greater degree of permanence for the fixture and (ii) a more robust connection to electrical wiring in the wall than if connectors were used, the greater degree of permanence satisfying a third criterion greater than each of the first criterion and the second criterion.

8. The system of claim 6, wherein the second degree of permanence is performed without enlarging the opening into which the socket and an enveloping box are installed in the wall.

9. The system of claim 5, wherein the fixture is installed on the wall by snapping the fixture and the backplate together.

10. The system of claim 9, wherein the fixture is flush-mounted on the wall of the space by coupling the back surface to the flush mount.

11. The system of claim 9, further comprising:
    a set screw configured to more firmly secure the fixture to the backplate, the set screw complementing the snapping.

12. The system of claim 5, wherein the backplate is sized to substantially the same width and height dimension of the fixture.

13. The system of claim 1, wherein dimensions of the fixture are within two to three times dimensions of the cover.

14. The system of claim 1, wherein the fixture, when installed on the wall, is elevated above a ground or floor level of the space such that (i) no floor space is consumed by the installation and (ii) a probability of occurrence of a jostling of the fixture is less.

15. A method for providing supplemental heating, the method comprising:
    providing a fixture configured to provide the supplemental heating to a space having a wall,
    wherein the fixture comprises:
        a heating element configured to heat air;
        an air movement device configured to circulate the heated air through the fixture to heat the space; and
        a back surface configured to mount flush on the wall by coupling to a flush mount, the back surface having a recess sized to substantially same dimensions of a cover of an electrical outlet,
    wherein the flush mount provides a first degree of permanence for the fixture that satisfies a first criterion.

16. The method of claim 15, wherein the flush mount is performed without having to remove the cover.

17. The method of claim 15, wherein the flush mount reduces a probability of damage to the wall via a jostling of the fixture.

18. The method of claim 15, wherein the flush mount prevents an arc across terminals of the electrical outlet, which would otherwise occur by the fixture being partially unplugged from the electrical outlet due to a jostling of the fixture.

19. The method of claim 15, wherein the fixture is directly coupled, via snapping means, to a backplate configured to replace the cover,
    wherein the fixture is configured, via the backplate, for a different flush mount on the wall, and
    wherein the different flush mount provides a second degree of permanence for the fixture that satisfies a second criterion greater than the first criterion, the second degree of permanence being based on one or more fasteners that fasten the backplate into the wall.

20. A method of using a fixture to provide supplemental heating to a space having a wall, the method comprising:
    providing the fixture, the fixture having a housing, an air movement device configured to circulate heated air through the housing to heat the space, and a back surface configured to mount flush on the wall;

mounting the fixture flush onto the wall by coupling the fixture to a flush mount, the flush mount providing a degree of permanence for the fixture;
providing a source of power to the fixture;
pulling ambient air into the housing of the fixture;
measuring a temperature of the ambient air;
determining a target temperature based on the measured air temperature; and
operating a heating element to heat the ambient air of the space to the target temperature.

\* \* \* \* \*